(12) United States Patent
Kodialam et al.

(10) Patent No.: US 7,978,594 B2
(45) Date of Patent: *Jul. 12, 2011

(54) EFFICIENT AND ROBUST ROUTING OF POTENTIALLY-VARIABLE TRAFFIC WITH LOCAL RESTORATION AGAINST LINK FAILURES

(75) Inventors: Muralidharan S. Kodialam, Marlboro, NJ (US); Tirunell V. Lakshman, Morganville, NJ (US); Sudipta Sengupta, Malden, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1629 days.
This patent is subject to a terminal disclaimer.

(21) Appl. No.: 11/141,372

(22) Filed: May 31, 2005

(65) Prior Publication Data
US 2005/0271060 A1    Dec. 8, 2005

Related U.S. Application Data

(63) Continuation-in-part of application No. 11/106,410, filed on Apr. 14, 2005.
(60) Provisional application No. 60/575,350, filed on May 28, 2004.

(51) Int. Cl.
*H04L 12/56* (2006.01)
(52) U.S. Cl. ........................... 370/216; 370/235
(58) Field of Classification Search ............... 370/238, 370/218, 230, 225, 217, 216, 228, 400, 220, 370/252; 714/4; 398/58; 709/242
See application file for complete search history.

(56) References Cited

U.S. PATENT DOCUMENTS

| | | | |
|---|---|---|---|
| 4,974,224 A * | 11/1990 | Boone | 370/400 |
| 5,392,344 A * | 2/1995 | Ash et al. | 379/221.07 |
| 5,506,848 A * | 4/1996 | Drakopoulos et al. | 370/336 |
| 6,021,113 A | 2/2000 | Doshi et al. | 370/228 |
| 6,130,876 A * | 10/2000 | Chaudhuri | 370/228 |
| 6,141,319 A * | 10/2000 | Dighe et al. | 370/218 |
| 6,314,093 B1 | 11/2001 | Mann et al. | 370/351 |
| 6,347,078 B1 * | 2/2002 | Narvaez-Guarnieri et al. | 370/230 |
| 6,538,991 B1 | 3/2003 | Kodialam et al. | 370/229 |

(Continued)

OTHER PUBLICATIONS

Meisel et al. "Multi-objective Scheme over Multi-tree routing in Multicast MPLS Networks" Oct. 2003, paper read at La Paz, Bolivia.*

(Continued)

*Primary Examiner* — Kwang B Yao
*Assistant Examiner* — Syed M Bokhari
(74) *Attorney, Agent, or Firm* — Mendelsohn, Drucker & Associates

(57) ABSTRACT

In one embodiment, a method for supporting recovery from failure of a link in a network of nodes interconnected by links. An intermediate node between an ingress point and an egress point of the network is selected to minimize the sum of (i) a capacity constraint between the ingress point and the intermediate node and (ii) a capacity constraint between the intermediate node and the egress point. The selection identifies two path structures, each comprising a primary path and one or more link backup detours protecting each link on the primary path, with a first path structure between the ingress point and the intermediate node, and a second path structure between the intermediate node and the egress point. To maximize network throughput, packets are routed in two phases, first to the intermediate node via the first path structure in predetermined proportions, and then from the intermediate node to the final destination via the second path structure.

23 Claims, 5 Drawing Sheets

U.S. PATENT DOCUMENTS

| | | | |
|---|---|---|---|
| 6,556,538 B1 * | 4/2003 | Croslin | 370/216 |
| 6,728,205 B1 * | 4/2004 | Finn et al. | 370/217 |
| 6,741,572 B1 | 5/2004 | Graves et al. | 370/254 |
| 6,771,651 B1 | 8/2004 | Beshai et al. | 370/401 |
| 7,180,853 B1 * | 2/2007 | Petajisto | 370/220 |
| 7,295,510 B2 * | 11/2007 | Johri | 370/216 |
| 7,308,198 B1 * | 12/2007 | Chudak et al. | 398/58 |
| 7,395,351 B1 * | 7/2008 | Nucci et al. | 709/242 |
| 2002/0133328 A1 | 9/2002 | Bowman-Amuah | 703/22 |
| 2002/0191545 A1 * | 12/2002 | Pieda et al. | 370/238 |
| 2003/0048749 A1 * | 3/2003 | Stamatelakis et al. | 370/225 |
| 2003/0099194 A1 | 5/2003 | Lee et al. | 370/22 |
| 2003/0227877 A1 * | 12/2003 | Kar et al. | 370/252 |
| 2004/0004938 A1 | 1/2004 | Buddhikot et al. | 370/238 |
| 2004/0042473 A1 | 3/2004 | Park et al. | 370/408 |
| 2004/0136379 A1 | 7/2004 | Liao et al. | 370/395.21 |
| 2004/0170173 A1 | 9/2004 | Pan et al. | 370/392 |
| 2004/0184603 A1 | 9/2004 | Pearson et al. | 380/28 |
| 2004/0202111 A1 | 10/2004 | Beshai et al. | 370/237 |
| 2004/0203820 A1 | 10/2004 | Billhartz | 455/452.1 |
| 2004/0213247 A1 * | 10/2004 | Seki et al. | 370/395.1 |
| 2005/0036486 A1 | 2/2005 | Sahinoglu et al. | 370/389 |
| 2005/0038909 A1 | 2/2005 | Yoshiba et al. | 709/241 |
| 2005/0053007 A1 * | 3/2005 | Bernhardt et al. | 370/238 |
| 2005/0188242 A1 * | 8/2005 | Rabbat et al. | 714/4 |
| 2006/0149852 A1 | 7/2006 | Schollmeier et al. | 709/238 |
| 2006/0165070 A1 * | 7/2006 | Hall et al. | 370/369 |

OTHER PUBLICATIONS

Meisel et al. paper "Multi-objective scheme over multi-tree routing in multicast MPLSnetworks", Conference LANC, Oct. 2003, pp. 59 through 71.*

"Analytical Framework for Dynamic Traffic Partitioning in MPLS Networks," by Esmael Dinan et al., 2000 IEEE International Conference on Communications, vol. 3 of 3, Jun. 18, 2000, pp. 1604-1608, XP1208682.

"Faster and Simpler Algorithms for Multicommodity Flow and other Fractional Packing Problems," by Naveen Garg, et al., 1998 IEEE Comput. Soc, US, Nov. 8, 1998, pp. 300-309, XP10318887.

"A Constrained Multipath Traffic Engineering Scheme for MPLS Networks," by Lee et al., 2001, 5 pages.

Non-Final Office Action received in U.S. Appl. No. 11/141,257, filed May 31, 2005 dated Nov. 28, 2008.

Non-Final Office Action received in U.S. Appl. No. 11/141,257, filed May 31, 2005 dated May 13, 2009.

Final Office Action received in U.S. Appl. No. 11/141,257, filed May 31, 2005 dated Dec. 2, 2009.

Non-Final Office Action received in U.S. Appl. No. 11/141,257, filed May 31, 2005 dated Aug. 4, 2010.

Non-Final Office Action received in U.S. Appl. No. 11/141,705, filed May 31, 2005 dated Apr. 29, 2008.

Non-Final Office Action received in U.S. Appl. No. 11/141,705, filed May 31, 2005 dated May 13, 2009.

Final Office Action received in U.S. Appl. No. 11/141,705, filed May 31, 2005 dated Nov. 24, 2009.

Non-Final Office Action received in U.S. Appl. No. 11/141,705, filed May 31, 2005 dated Jun. 29, 2010.

Non-Final Office Action received in U.S. Appl. No. 11/106,410, filed Apr. 14, 2005 dated May 28, 2008.

Non-Final Office Action received in U.S, Appl. No. 11/106,410, filed Apr. 14, 2005 dated Dec. 10, 2008.

Non-Final Office Action received in U.S. Appl. No. 11/106,410, filed Apr. 14, 2005 dated May 27, 2009.

Non-Final Office Action received in U.S. Appl. No. 11/106,410, filed Apr. 14, 2005 dated Dec. 3, 2009.

Final Office Action received in U.S. Appl. No. 11/106,410, filed Apr. 14, 2005 dated Jun. 8, 2010.

* cited by examiner

| Link | Backup Path (Detour) |
| --- | --- |
| i-a | i-1-2-a |
| a-b | a-3-4-b |
| b-j | b-3-4-5-j |

$\alpha_k \leftarrow 0 \; \forall k \in N$;
$w(e,f) \leftarrow \delta \; \forall e,f \in E, e \neq f$;
$\text{work}(e) \leftarrow 0 \; \forall e \in E$;
$\text{bkp}(e,f) \leftarrow 0 \; \forall e,f \in E, e \neq f$;
$G \leftarrow 0$;

while $G < 1$ do

For each $e = (i,j) \in E$, compute shortest path from $i$ to $j$ that excludes link $e$ under link costs $c(e') = w(e,e)$ and denote its cost by $g(e)$;
    For each $i,j \in N$, compute shortest path from $i$ to $j$ under link costs $c(e) = [\sum_{f:f \neq e} w(e,f) + g(e)]$ and denote its cost by $SP(i,j)$;
    $V(k) \leftarrow \sum_{i \neq k} R_i SP(i,k) + \sum_{j \neq k} C_j SP(k,j)$;
    $G \leftarrow \min_{k \in N} V(k)$;
    if $G \geq 1$ break;
    Let $\bar{k}$ be the node for which $V(k)$ is minimum;
    Let $P_i$ be shortest path from $i$ to $\bar{k}$ for all $i$;
    Let $Q_j$ be shortest path from $\bar{k}$ to $j$ for all $j$;
    $N_P(e) \leftarrow \{i : P_i \text{ contains } e\}$ for all $e$;
    $N_Q(e) \leftarrow \{j : Q_j \text{ contains } e\}$ for all $e$;
    $\alpha \leftarrow \min_{e \in E} \dfrac{u_e}{\sum_{i \in N_P(e)} R_i + \sum_{j \in N_Q(e)} C_j}$;
    Send $\alpha R_i$ flow on path $P_i$ for all $i$ and $\alpha C_j$ flow on path $Q_j$ for all $j$ and compute resulting working flow $\Delta(e)$ on link $e$ for all $e$ and restoration flow $\Delta'(e,f)$ on link $e$ due to failure of link $f$ for all $e \neq f$;
    $\text{work}(e) \leftarrow \text{work}(e) + \Delta(e) \; \forall e$;
    $\text{bkp}(e,f) \leftarrow \text{bkp}(e,f) + \Delta'(e,f) \; \forall e \neq f$;
    $w(e,f) \leftarrow w(e,f)(1 + \epsilon \Delta(e)/u_e) \; \forall e \forall f$;
    $w(e,f) \leftarrow w(e,f)(1 + \epsilon \Delta'(e,f)/u_e) \; \forall e \neq f$;
    $\alpha_{\bar{k}} \leftarrow \alpha_{\bar{k}} + \alpha$;

end while

$\text{bkp\_max}(e) \leftarrow \max_{f \neq e} \text{bkp}(e,f) \; \forall e \in E$;
$\text{scale}(e) \leftarrow \dfrac{\text{work}(e) + \text{bkp\_max}(e)}{u_e} \; \forall e \in E$,
$\text{scale\_max} \leftarrow \max_{e \in E} \text{scale}(e)$,
$\alpha_k \leftarrow \alpha_k / \text{scale\_max}$ for all $k \in N$;
Output $\alpha_k$ as the optimal traffic split ratios;

EFFICIENT AND ROBUST ROUTING OF POTENTIALLY-VARIABLE TRAFFIC WITH LOCAL RESTORATION AGAINST LINK FAILURES

CROSS-REFERENCE TO RELATED APPLICATIONS

This is a continuation-in-part of co-pending application Ser. No. 11/106,410, filed on Apr. 14, 2005, which claims priority to co-pending U.S. Provisional Application Ser. No. 60/575,350, filed on May 28, 2004, the teachings of both of which are incorporated herein by reference.

This application is one of a set of U.S. patent applications consisting of Ser. No. 11/141,257, Ser. No. 11/141,705, and Ser. No. 11/141,372, all of which were filed on the same date and the teachings of all of which are incorporated herein by reference.

BACKGROUND OF THE INVENTION

1. Field of the Invention

The present invention relates to routing in telecommunication systems, and, more particularly, to determining links through nodes of a network for efficient and robust routing following link failure.

2. Description of the Related Art

In packet-based communications networks, such as the Internet, each stream of data packets, called a packet flow, is transferred through the network over a network path from a source to a destination. Each network path is defined by a set of nodes, interconnected by a set of links. A node may include one or more routers, which are devices in the network that handle data transfer between computers.

A communications system may be structured such that different-sized networks are interconnected and may alternatively or additionally include one or more peer structures in which equivalent-sized networks are interconnected. A packet network may connect to another packet network through nodes referred to as the ingress and egress points. The terms ingress point and egress point may refer to a node of a packet network that connects to another packet network, or alternatively, these terms may refer to the connecting nodes of the other packet network. Packet networks with high capacity that transfer packets between two or more other packet networks are commonly referred to as "backbone" networks.

FIG. 1 shows a backbone network 100 of the prior art having nodes n1-n9 interconnected through links 101, which enable communication between packet networks 102-104. One of the ingress points of backbone network 100 is node n1, which receives packets from a source (i.e., packet network 102), and one of the backbone network's egress points is node n4, which transmits packets to a destination (i.e., packet network 104). Backbone network 100 may support an interior routing protocol to distribute network topology information and route packets between ingress and egress points based on best-effort routing (e.g., destination-based shortest-path routing) through nodes n1-n9. A centralized network management system 105 may be employed to (i) provision virtual circuits, or packet flows, through backbone network 100; (ii) monitor capacity and utilization of links 101; and (iii) coordinate calculation and installation of provisioned paths. Forwarding tables are used by each node to forward each received packet to the next node toward its destination. In addition, centralized network management system 105 may also be employed to collect and distribute network topology information.

An interior routing protocol is employed to determine forwarding of packets between a source and destination pair along a path through the nodes of the backbone network. Packets received by a node are forwarded to other nodes based on a forwarding table constructed in accordance with the interior routing protocol or routes installed with explicit route provisioning. An interior routing protocol may also specify the exchange of network topology and link-state information ("network topology information") among nodes to allow a node to construct the corresponding forwarding table. In addition, some routing protocols associate a link "cost" with each link between nodes. This link cost may be associated with, for example, average link utilization or revenue generated by the link, as well as link importance in the network. When link-state information or link-bandwidth (e.g., connectivity or available bandwidth) is exchanged between routers, each node in the network has a complete description of the network's topology. An example of a widely used, interior routing protocol for "best-effort" routing is the Open Shortest Path First (OSPF) protocol.

Routing protocols, in addition to providing connectivity, may also enable traffic management. The Multi-Protocol Label Switched (MPLS) standard, for example, allows such routing protocols in backbone networks. The MPLS standard may be employed for networks having virtual circuits (packet flows) with provisioned service levels (also known as guaranteed quality-of-service (QoS)).

A provisioned service level may be, for example, a guaranteed minimum bandwidth for the path of a packet flow through the backbone network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label-switched paths (LSPs) may be established for packets in MPLS networks. Packets of a signaling protocol, such as RSVP (Reservation Protocol for IP and MPLS networks) or LDP (Label Distribution Protocol for MPLS networks), may be used to reserve link bandwidth and establish an NTP, once routing for the NTP is calculated. An NTP may be provisioned as an explicit route along a specific path between nodes of the backbone network, i.e., when an NTP is provisioned for a packet flow, all intermediate nodes between the ingress and egress points of the NTP may be specified through which each packet of the flow passes.

In MPLS networks, packets are encapsulated by appending to the packet, or forming from the packet, additional information when the packet is received at an ingress point. The additional information, called a label, is used by routers of the backbone network to forward the packets. FIG. 2 shows such an encapsulated packet 200 having a label 201 appended to packet 202. The label summarizes information in the packet header. The summary may be based on the header field and include an origination (source) address field (o) 210 identifying the address of the ingress point and a termination (destination) address field (t) 211 identifying the address of the egress point(s). In some cases, the label may simply be a pointer that identifies or is otherwise related to specific origination and termination address fields in the header of the received packet. The label also includes one or more service-level fields (bd) 212. Service-level field 212 may identify a desired service level for the virtual circuit (called a "demand"), such as minimum bandwidth required. In some networks, the service-level field is implied from the label itself. Other fields 213 may be included in label 201, such as MPLS standard version, interior routing protocol version, maximum delay, or other types of service-level parameters. Label 201 may alternatively be inserted into packet header (PH) 214 of packet 202, so the order of fields shown in FIG. 2 is exemplary only. Backbone networks may employ labels to group encapsulated packets having similar LSPs into classes (equivalence classes), and methods for forwarding equivalence classes may be employed to simplify calculation of routing for LSPs.

To generate a forwarding table, a set of preferred paths through the network nodes is computed, and weights may be used to calculate the set of preferred paths. Each preferred path has a minimum total weight between nodes (the total weight of a path being the summation of the weights of all links in the path), which is employed in a technique known in the art as shortest-path routing. The resulting set of preferred paths may be defined with a shortest-path tree (SPT). The forwarding table with routing information (e.g., source-destination pair, source ports, and destination ports) is generated from the SPT. The routing information is then used to forward a received packet to its destination along the shortest path of the SPT. The SPT may be calculated using an algorithm such as Dijkstra's algorithm, described in E. Dijkstra, "A Note: Two Problems In Connection With Graphs," Numerical Mathematics, vol. 1, 1959, pp. 269-271, the teachings of which are incorporated herein by reference.

A common shortest-path routing algorithm employed by routers to generate routing of an LSP is the min-hop algorithm. In the min-hop algorithm, each router calculates a path through the backbone network for the stream of packets (packet flow) between the ingress and egress points. Each router constructs a path for routing the packet flow from the ingress point to the egress point with the least number ("min") of feasible links ("hops") (a feasible link is a link that has sufficient capacity to route the packet flow). Routing schemes of the prior art, such as shortest-path routing, forward packets based only on destination addresses and use only static and traffic-characteristic-independent link weights to calculate paths for routing tables. Some links on the shortest path between certain pairs of ingress and egress points may be congested, while other links on alternative paths are underutilized.

A signaling mechanism, such as RSVP or LDP, may be employed to both reserve and establish a connection through the network for a packet flow. The signaling mechanism may specify quality-of-service attributes for the LSP traversing the backbone network. Link congestion caused by shortest-path routing of multiple LSPs may cause rejection of reservation requests by signaling mechanisms, even though sufficient levels of service (quality-of-service guarantees) for the LSP may exist in alternative, under-utilized paths that are only slightly longer. Available network resources are not always efficiently utilized when shortest-path routing is employed.

The Border Gateway Protocol (BGP) is an interautonomous system routing protocol. An autonomous system is a network or group of networks under a common administration and with common routing policies. An interautonomous system routing protocol is used to route data between autonomous systems. BGP is used to exchange routing information for the Internet and is the protocol used between Internet service providers (ISPs). Customer networks, such as universities and corporations, usually employ an Interior Gateway Protocol (IGP), such as Routing Information Protocol (RIP) or Open Shortest Path First (OSPF), for the exchange of routing information within their networks. Customers connect to ISPs, and ISPs use BGP to exchange customer and ISP routes. BGP can be used between autonomous systems, or a service provider can use BGP to exchange routes within an autonomous system.

A major problem in networks is BGP-induced traffic variation. Extreme network traffic fluctuations can happen for a variety of reasons. For example, in the case of a large Internet service provider exchanging traffic with several other providers, the traffic exchange between carriers is typically specified by total traffic volumes over long time periods and possibly a peak rate limit (usually just determined by physical link capacities). The actual distribution of traffic entering at an ingress point to the various network egress points might not be known a priori and can change over time. This is because the distribution is determined by many factors, such as intrinsic changes in traffic to different destination prefixes, and by routing changes either made locally by the carrier or due to changes made in other autonomous systems over which the carrier has no control. Intrinsic changes in traffic distribution can be caused by many factors, such as the sudden appearance of flash crowds responding to special events. An example of local routing changes that can affect the traffic distribution is IGP weight changes combined with "hot-potato" routing, which can change the network egress point that traffic destined to a set of prefixes would otherwise choose. "Hot-potato" routing is a form of routing in which the nodes of a network have no buffers to store packets in before they are moved on to their final predetermined destination, such that each packet that is routed is constantly transferred until it reaches its final destination. Thus, the packet is bounced around like a "hot potato," sometimes moving further away from its destination because it has to keep moving through the network. Another example is the change in BGP when a Multi-Exit Discriminator (MED) is employed. An MED, also referred to as the "external metric" of a route, is a suggestion to external neighbors about the preferred path into an autonomous system that has multiple entry points. While local routing changes are under a carrier's control and hence change traffic patterns only at planned instances, unpredictable traffic shifts can happen when routing changes in other autonomous systems affect downstream autonomous systems. Due to widespread use of hot-potato routing, IGP weight changes (which can be due to new links being added, maintenance, traffic engineering, etc.) in an autonomous system can cause significant shifts in traffic patterns. Changes in IGP costs can affect the BGP route for a significant percentage of the prefixes, and the affected prefixes can account for a significant percentage of the traffic. Thus, significant shifts in traffic may happen at a carrier due to changes elsewhere in the network.

Another reason that high traffic variability should be considered is that users or carriers entering peering agreements might not be able to characterize their traffic to various sites well. It is much easier to estimate only the total aggregate bandwidth that is either received or sent. Hence, it is preferable to avoid having to rely on knowing the exact traffic matrix and instead use only a partial specification of the traffic matrix. Also, even when the traffic matrix is known, it is often difficult to detect changes in the traffic distribution.

Network congestion typically occurs either due to loss of capacity (upon router or link failures) or due to increased capacity demand (caused by large increases in traffic). In response to these uncontrollable events, carriers should and repeatedly adapt their intra-domain routing to avoid network congestion or have sufficient capacity set aside a priori to accommodate the different traffic and failure patterns that can occur without resorting to routing changes. It is preferable to avoid frequent intra-domain routing changes due to operational complexity and costs, and due to the risk of network instability if changes are not implemented correctly. Moreover, as discussed above, changes in one autonomous system may cause cascading traffic changes in other autonomous systems, thereby affecting the overall stability of many Internet paths. The trade-off in avoiding large routing changes is the significant capacity overprovisioning that must be done to accommodate failures or changing traffic patterns. Ideally, providers would prefer to use an almost-fixed routing scheme that (i) does not require traffic-dependent dynamic adaptation of configuration parameters, (ii) minimizes dynamic capacity re-allocation after failures, and (iii) is minimal in its overprovisioning needs.

Another application where the traffic matrix is unknown a priori is the provision of network-based virtual private network (VPN) services to enterprise customers. Here, a service-level agreement with each customer specifies the amount of traffic that can be sent or received by each site belonging to a VPN. In this scenario, users do not know their traffic matrices and specify to the carrier only the total traffic volume and the peak rate. It is the carrier's task to transport all of the offered VPN traffic to the network and carry that traffic without introducing too much delay. The actual traffic distribution from each site to the other sites is typically unknown and could vary by time-of-day. The carrier network is tasked to carry all of the offered VPN traffic without experiencing network congestion upon traffic-pattern changes or upon node or link failures.

Networks for grid computing provide a further scenario in which traffic variations can be extreme, and the traffic matrix is not known a priori. In grid computing, a complex computational task is partitioned amongst different computing nodes that can be geographically distributed and are connected by a network. The communication patterns amongst grid-computing nodes are highly unpredictable and also can experience high burst rates. Since the traffic matrix is not known a priori, one option is to dynamically reserve capacity over an underlying network, but this approach will be too slow for many grid-computing applications. Because of the high variability in destinations and the bursty nature of the traffic, overprovisioning the network leads to very poor capacity usage most of the time.

To provide good service when traffic patterns can change uncontrollably, carriers should either quickly and repeatedly adapt their intra-domain routing to avoid network congestion or have sufficient capacity set aside a priori to accommodate the different traffic patterns that can occur without resorting to routing changes. Service providers prefer to avoid frequent intra-domain routing changes due to (i) operational complexity and costs and (ii) the risk of network instability if link metric changes are not implemented correctly. Moreover, changes in one autonomous system in a BGP application may cause cascading traffic changes in other autonomous systems, thereby affecting the overall stability of many Internet paths. The trade-off in avoiding routing changes is the significant capacity overprovisioning that can be done to accommodate changing traffic patterns while keeping the routing fixed. Ideally, providers would like to use a fixed routing scheme that does not require traffic-dependent dynamic adaptation of configuration parameters and is parsimonious in its capacity needs.

Moreover, in IP-over-Optical Transport Networks (OTN), routers are connected through a reconfigurable switched optical backbone, or OTN, consisting of optical cross-connects (OXCs) that are typically less expensive than IP router ports. The OXCs are interconnected in a mesh topology using wave-division multiplexing (WDM) links. The core optical backbone consisting of such OXCs takes over the functions of switching, grooming, and restoration at the optical layer. Since the IP traffic flow is carried on an optical-layer circuit (called a "lightpath"), the bypass of router ports for transit traffic creates a basis for huge economies of scale to be reaped by interconnecting IP routers over an optical backbone in IP-over-OTN. By moving transit traffic from the routers to the optical switches, the requirement to upgrade router Point-of-Presence (PoP) configurations with increasing traffic is minimized, since optical switches are more scalable due to their typically increased port count over that of routers. In an IP-over-OTN architecture, a router line card is typically more expensive than an optical switch card, and thus, network cost is typically reduced by keeping traffic mostly in the optical layer. Also, since optical switches are typically much more reliable than routers, their architecture is typically more robust and reliable. Because routers are interconnected over a switched optical backbone, the routing process compromises between keeping traffic at the optical layer and using intermediate routers for packet grooming in order to achieve efficient statistical multiplexing of data traffic.

Dynamic provisioning of bandwidth-guaranteed paths with fast restoration capability is a desirable network service feature for many networks, such as Multi-Protocol Label Switched (MPLS) networks and optical mesh networks. In optical networks, fast restoration is also desirable, since optical transport networks carry a variety of traffic types, each with different, stringent reliability requirements. Similar fast restoration capabilities may be used in MPLS networks in order to provide the needed reliability for services such as packetized voice, critical virtual private network (VPN) traffic, or other quality-of-service (QoS) guarantees.

A connection in a network might be protected at the path level or at the link level. For link restoration (also referred to as local restoration or as fast restoration), each link of the connection is protected by a set of one or more pre-provisioned detour paths that exclude the link being protected. Upon failure of the link, traffic on the failed link is switched to the detour paths. Thus, link restoration provides a local mechanism to route around a link failure. In path restoration, the primary, or working, path of the connection is protected by a "diverse" backup path from source to destination. Upon failure of any of the resources on the working path, traffic is switched to the backup path by the source node. Link restoration might typically restore service much faster than path restoration because restoration is locally activated and, unlike path restoration, failure information need not propagate back through the network to the source.

Service restoration is an important requirement of optical networks. If a network element fails, such as a node (optical switch) or link (optical fiber), the failure causes one or more particular wavelength paths to fail, and affected traffic flow(s) must be restored using an alternative path within a very short interval (e.g., 50 ms). To accomplish relatively rapid restoration times, provisioning identifies, for each wavelength path, two paths through the network: a primary (active) path and a secondary (backup) path. The backup path is link disjoint (active and backup paths do not share links) or node disjoint (active and backup paths do not share either nodes or links) with the primary path. The capacity of links in the backup path may be exclusively assigned to a corresponding primary path (e.g., wavelength), or, for network bandwidth usage efficiency, the capacity may be shared between links of backup paths for different primary paths, depending on the type of restoration desired. Optical network capacity design typically accounts for restoration needs to route disjoint secondary paths with possible sharing.

A problem that frequently arises in networks where the traffic matrix is unknown a priori is trying to achieve the fast restoration of network services after a router or link failure. In this scenario, service providers desire for their networks to be self-managed and self-healing by being able to (i) automatically restore equivalent service to all the traffic that is affected by a router or link failure, (ii) achieve fast restoration by pre-provisioning of capacity so as to minimize dynamic capacity reallocation after failure, (iii) achieve bandwidth efficiencies to avoid excessive overprovisioning, (iv) achieve operational simplicity by use of simple, almost static but fault-tolerant routing schemes, (v) accommodate highly varying traffic without requiring frequent changes to network configuration, (vi) handle any traffic pattern permissible within the constraints imposed by the network's edge-link capacities, (vii) avoid network congestion under high or unpredictable traffic variability without requiring dynamic routing-policy adjustments, and (viii) have capacity requirements close to those needed to accommodate a single traffic matrix while being able to handle all possible traffic matrices subject to ingress-egress capacity constraints.

SUMMARY OF THE INVENTION

The present invention provides a scheme based on the idea of replacing shortest-path Interior Gateway Protocol (IGP) routing within a carrier's domain by a modified routing scheme that routes traffic to the destination after ensuring that it passes through one or more pre-determined intermediate nodes also in the carrier's domain. (The assignment of intermediate nodes is made at the flow level to avoid packet resequencing issues.) Egress nodes are still chosen based on Border Gateway Protocol (BGP)-determined autonomous system paths and auxiliary carrier routing policies such as hot-potato routing. A scheme consistent with one embodiment of the present invention changes the IGP path selection of direct shortest paths to one that passes through one or more a priori-assigned intermediate nodes. In MPLS networks, this routing through one or more pre-determined intermediate nodes can be accomplished using a pre-configured set of MPLS LSPs between the ingress node and a chosen set of one or more intermediate nodes to which flows are assigned according to specified probabilities. In pure IP networks, this routing can be accomplished by tunneling packets to the one or more pre-determined intermediate nodes first. This routing with pre-determined selection of one or more intermediate nodes is sufficient to handle all traffic patterns that are permissible, subject to edge-link capacity constraints, and further, provides protection against router and optical-layer link failures. Moreover, routing adaptations are not needed when the traffic matrix changes, and the scheme is bandwidth efficient.

A routing scheme consistent with one embodiment of the invention employs a Fully Polynomial-Time Approximation Scheme (FPTAS) to determine the optimal distribution of traffic to various intermediate nodes and traffic redistribution after failures. Algorithms may also be employed for fault-tolerant path provisioning in the optical layer to provide the needed inter-router links.

Accordingly, a routing scheme consistent with one embodiment of the invention can be configured to quickly "self-heal" the network after a router or link failure. Users are not required to characterize their offered traffic on a prefix basis, nor is the network required to accurately estimate traffic matrices and detect departures from predicted traffic patterns. The only traffic knowledge that the routing scheme needs are the row and column sum bounds on the traffic matrix. These row and column sum bounds correspond to the network's ingress and egress capacities, i.e., the total traffic that can enter or leave the network at each border router. Within the constraints of these capacity bounds, traffic can be highly variable.

In one embodiment, the present invention provides a method for supporting recovery from failure of a link in a network of nodes interconnected by links. The method comprises: (a) selecting an intermediate node between an ingress point and an egress point of the network, wherein the intermediate node minimizes the sum of (i) a capacity constraint between the ingress point and the intermediate node and (ii) a capacity constraint between the intermediate node and the egress point; wherein the selection identifies a first path structure between the ingress point and the intermediate node, and a second path structure between the intermediate node and the egress point, each path structure comprising a primary path and one or more link backup detours protecting each link on the primary path; (b) implementing, during a first routing phase, a first routing method for routing a fraction of a service level between the ingress point and the intermediate node along the primary path of the first path structure; and (c) implementing, during a second routing phase, a second routing method for routing a fraction of the service level between the intermediate node and the egress point along the primary path of the second path structure.

In another embodiment, the present invention provides an apparatus for supporting recovery from failure of a path in a network of nodes interconnected by links is adapted to: (a) select an intermediate node between an ingress point and an egress point of the network, wherein the intermediate node minimizes the sum of (i) a capacity constraint between the ingress point and the intermediate node and (ii) a capacity constraint between the intermediate node and the egress point; wherein the selection identifies a first path structure between the ingress point and the intermediate node, and a second path structure between the intermediate node and the egress point, each path structure comprising a primary path and one or more link backup detours protecting each link on the primary path; (b) implement, during a first routing phase, a first routing method for routing a fraction of a service level between the ingress point and the intermediate node along the primary path of the first path structure; and (c) implement, during a second routing phase, a second routing method for routing a fraction of the service level between the intermediate node and the egress point along the primary path of the second path structure.

In a further embodiment, the present invention provides a network of nodes interconnected by links. The network comprises an apparatus for supporting recovery from failure of a path of the network. The apparatus is adapted to: (a) select an intermediate node between an ingress point and an egress point of the network, wherein the intermediate node minimizes the sum of (i) a capacity constraint between the ingress point and the intermediate node and (ii) a capacity constraint between the intermediate node and the egress point; wherein the selection identifies a first path structure between the ingress point and the intermediate node, and a second path structure between the intermediate node and the egress point, each path structure comprising a primary path and one or more link backup detours protecting each link on the primary path; (b) implement, during a first routing phase, a first routing method for routing a fraction of a service level between the ingress point and the intermediate node along the primary path of the first path structure; and (c) implement, during a second routing phase, a second routing method for routing a fraction of the service level between the intermediate node and the egress point along the primary path of the second path structure.

BRIEF DESCRIPTION OF THE DRAWINGS

FIG. 8 shows pseudo-code for an exemplary algorithm that may be employed in a routing method consistent with one embodiment of the present invention.

DETAILED DESCRIPTION

Figure 3:
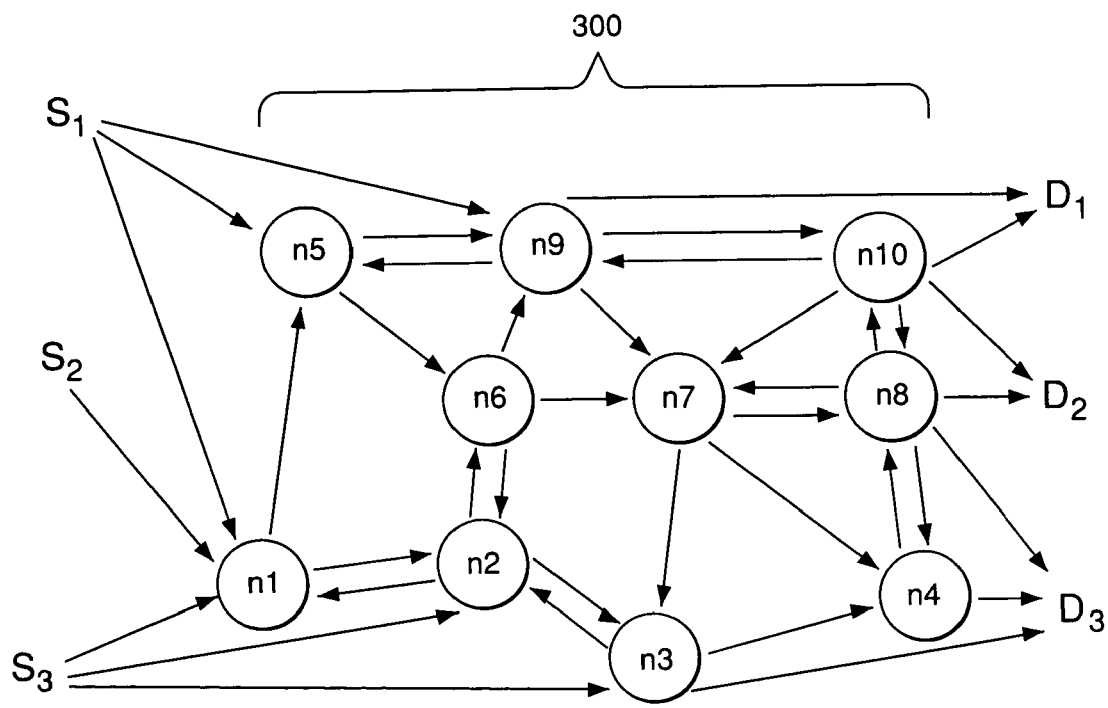
FIG. 3 shows a network of interconnected nodes that employs a method of routing with service-level guarantees for routing label-switched paths consistent with one embodiment of the present invention.

FIG. 3 shows a network 300 of interconnected nodes n1-n10 that employs an exemplary implementation of the routing method with service-level guarantees in accordance with the present invention. The routing method determines a path through network 300 for a request for a network tunnel path, such as a label-switched path (LSP). Each of the nodes n1-n10 includes one or more routers that forward packets based on a forwarding table constructed from paths determined in accordance with a routing method of the present invention. The exemplary routing method routes packets of the requested LSP in two phases, whereby incoming traffic is first sent to a set of one or more intermediate nodes in predetermined proportions, and then from the intermediate nodes to the final destination, to maximize network throughput. Such routing method might not necessarily route packets of a requested LSP along the shortest path, or minimum number of hops, through the network.

While the exemplary embodiments of the present invention are described herein for networks employing the MPLS standard with path requests with associated service levels, such as LSP requests, the present invention is not so limited. The present invention may also be employed in other contexts, such as where requests are received for Network Tunnel Paths (NTPs) having a guaranteed level of service between ingress and egress points. NTPs may be, for example, virtual circuits for packet flows in TCP/IP networks, connections of cells in Asynchronous Transfer Mode (ATM) networks, and LSPs (for packets in MPLS networks). The present invention may also have particular utility in IP-over-OTN (or other circuit-switched networks) in the context of routers that are connected through a reconfigurable switched optical backbone consisting of OXCs, whereby the core optical backbone takes over the functions of switching, grooming, and restoration at the optical layer.

A network of interconnected nodes such as network 300 is defined as G(N, E), where N is the set of nodes n1 through n10, and E is the set of links (arcs) or (directed) edges interconnecting the nodes. While, in the exemplary embodiments described herein, the value for available resources such as service level is bandwidth capacity of a link or path, service-level values in other embodiments may alternatively or additionally include one or more link parameters such as delay, probability of packet loss, revenue, or other quality-of-service parameter. As known in the art, one or more of these various service-level values may be expressed by a quantity termed effective bandwidth. A link $e_{ij}$ in the set E of links has two subscripts, i and j ($0<i,j \leq N$), representing the nodes $n_i$ and $n_j$ connected by link $e_{ij}$. Without loss of generality, each link $e_{ij}$ is directional (packet flows go from node $n_i$ to node $n_j$). Sources $S_1$, $S_2$, and $S_3$ in FIG. 3 may be packet networks collectively providing packet flows to routers in nodes n1, n2, n3, n5, and n9, which nodes are potential ingress points for connecting to external networks, e.g., other carriers. Similarly, destinations $D_1$, $D_2$, and $D_3$ may be packet networks collectively receiving packet flows from routers in nodes n3, n4, n8, n9, and n10, which nodes are potential egress points for connecting to external networks. It should be recognized that any node in a network could be an ingress point and/or an egress point. Sources $S_1$, $S_2$, and $S_3$ are connected to ingress points, while destinations $D_1$, $D_2$, and $D_3$ are connected to egress points. Source-destination pairs are defined as ($S_1$, $D_1$), ($S_1$, $D_2$), ($S_1$, $D_3$), ($S_2$, $D_1$), ($S_2$, $D_2$), ($S_2$, $D_3$), ($S_3$, $D_1$), ($S_3$, $D_2$), and ($S_3$, $D_3$), and each node may support one or more sources and/or one or more destinations. Nodes n1-n10 may also have, or have access to, current network topology and link status information (hereinafter referred to as "network topology"), which may be provided and distributed through the network using a distributed protocol (e.g., by control packets conforming to the OSPF protocol).

Figures 1, 2:
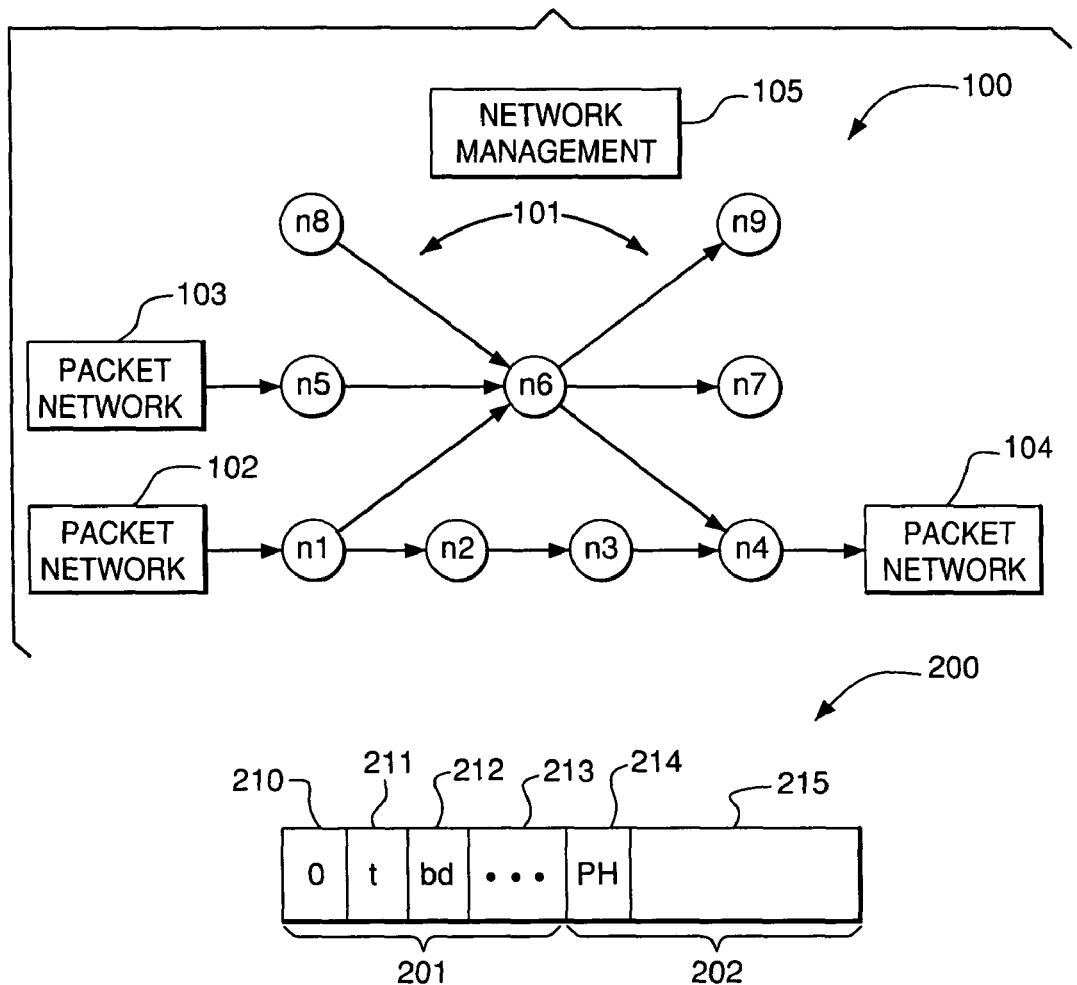
FIG. 1 shows an exemplary backbone network of the prior art having nodes interconnected through links that allow communication between other packet networks.
FIG. 2 shows an encapsulated packet employed by the backbone network of FIG. 1 to route packets from an ingress point to an egress point.

Sources $S_1$, $S_2$, and $S_3$ generate packets for new or currently provisioned LSPs in network 300, which packets include fields identifying the ingress-egress point pair (e.g., address of either source $S_1$, $S_2$, or $S_3$ and address of either destination $D_1$, $D_2$, and $D_3$). Signaling packets of, for example, RSVP or LDP may be used to communicate quality-of-service (QoS) attributes or guarantees, such as bandwidth, to network elements (e.g., routers or nodes); however, packets of LSPs may also include values for one or more service-level parameters corresponding to QoS attributes or guarantees. These packets of LSPs transferred through network 300 may conform to the MPLS standard and may have a format similar to that shown and described with respect to FIG. 2.

For network 300 shown in FIG. 3, nine potential ingress-egress point pairs (source-destination pairs) exist. For the following discussion, each link (i,j) (also referred to herein as $e_{ij}$) interconnecting nodes $n_i$ and $n_j$ has an associated available capacity $u_{ij}$ (or $u_e$), termed residual bandwidth. Residual bandwidth $u_e$ of a link is the difference between the total bandwidth of the link and the sum of the bandwidth demands of LSPs that are currently assigned to that link. Networks may exchange information regarding residual capacity of links (such as in QoS shortest-path first (QoSPF) networks), which may be employed for distributed calculation of routes. Residual bandwidth may commonly be expressed in, for example, kbits/sec or Mbits/sec, or may be expressed as a percentage of the link's total capacity. Each link (i,j) interconnecting nodes $n_i$ and $n_j$ may also have an associated link cost $c_{ij}$ (or $C_e$), i.e., an associated scalar weight that may correspond to a relative usage, importance, or other cost of the particular link. Link cost may also refer to the scalar weight of a particular ingress-egress point pair. Link cost may be assigned to a particular link to allow routing algorithms to favor or disfavor routing through the particular link because of, for example, delay, cost to provide bandwidth, other traffic engineering considerations, or other physical link-layer considerations.

In general, a request arrives at network 300 to provision and route a path between an ingress point o and egress point t having a requested service level of bd (a "demand" bd). For the exemplary network of FIG. 3, this may be an LSP or other form of NTP request to provision a path between a source-destination pair, e.g., ($S_1$, $D_1$), with a requested bandwidth bd Mb/sec. LSP requests may arrive one at a time, with no a priori knowledge of the characteristics of demands for bandwidth by future LSP requests. In addition, no a priori knowledge of (i) the characteristics of QoS attributes or guarantees, (ii) connection arrivals, hold time, or departures, and (iii) other traffic-engineering information is necessarily available. The demand bd may be an "equivalent" or "effective" bandwidth value since the packets of a packet flow may represent a stochastic process with varying bandwidth needs. As is known in the art, service-level (e.g., QoS) attributes or requirements may be translated into an equivalent or effective bandwidth value. The equivalent or effective bandwidth value is a deterministic value approximating the stochastic variable based on, e.g., peak and average packet rate, arrival and hold times, and connection duration.

A routing method in accordance with the present invention evaluates and routes an LSP along one or more paths through the network between ingress-egress point pairs. The set P is the set of specific (distinguished) node ingress-egress point pairs included in the network G(N, E) that are the potential source-destination pairs (($S_1$,$D_1$), ($S_1$,$D_2$), . . . , ($S_3$,$D_3$)). An element of the set P is denoted as (s, d) (i.e., (s, d)∈P) where s and d correspond, respectively, to a source network and a destination network. Multiple LSPs may be provisioned between an element (s, d).

An LSP request to network 300 may be implemented either through a centralized network management system (not shown in FIG. 3) or by control messages provided to nodes n1-n10 of the network 300 in accordance with a distributed protocol. Either a centralized network management system and/or each network router implements an exemplary routing method for the LSP request to determine a path to be provisioned through the network corresponding to the requested LSP. Provisioning by either the centralized network management system and/or each network router allows RSVP control (e.g., QoS requests of the RSVP signaling protocol) to establish one or more connections (packet flows) with, for example, a demanded bandwidth or other type of service level.

The node-arc incidence matrix M is defined as an (n×e) matrix (where n is equal to the number of elements of the set N, and e is equal to the number of elements of the set E') in which each row corresponds to a different node n of the set N, and each column corresponds to a different link e of the set E. Each column has two non-zero entries (i,j) for the corresponding link $e_{ij}$ between nodes $n_i$ and $n_j$. The column corresponding to link $e_{ij}$ has a "+1" value in the row i, a "−1" value in the row j, and a "0" value in each position corresponding to all other rows.

The total amount of traffic that enters (or leaves) an ingress (or egress) node in the network is bounded by the total capacity of all external ingress (or egress) links (e.g., line cards to customer networks or other carriers) at that node. For any given node i, the upper bounds on the total amount of traffic (e.g., bandwidth or other service level) leaving from node i is $R_i$, and the upper bounds on the total amount of traffic (e.g., bandwidth or other service level) entering node i is $C_i$. These link-capacity bounds, which are modeled based on factors such as the maximum capacity of hardware physically located inside a router's chassis, constrain the point-to-point matrix for the traffic in the network. These constraints might be the only known aspects of the traffic to be carried by the network, and knowing these is equivalent to knowing the row and column sum bounds on the traffic matrix, i.e., the maximum possible row sum indicates the maximum possible outgoing traffic, and the maximum possible column sum indicates the maximum possible incoming traffic. Accordingly, any allowable traffic matrix T=<$t_{ij}$> for the network obeys the following equations (1) and (2), where T is an (n×n) matrix (wherein n is the number of nodes), with the (i,j)th entry representing the traffic from node i to node j:

$$\sum_{j:\, j\neq i}^{n} t_{ij} = R_i \quad \forall\, i \in N, \text{ and} \tag{1}$$

$$\sum_{j:\, j\neq i}^{n} t_{ji} = C_i \quad \forall\, i \in N. \tag{2}$$

It is sufficient to consider equality (as opposed to ≦) in the foregoing equations (1) and (2) because any matrix T'∈T(R,C) whose any row or column sums to a value less than the given bounds can be transformed to a matrix T=T'+T"∈T(R,C) by addition of a matrix T" with non-negative (non-diagonal) entries. T(R,C) represents the set of all possible traffic matrices. Thus, any routing scheme that routes T can also route T'.

For given $R_i$ and $C_i$ values, the set T(R,C) of all such matrices that are specified only by their row and column sums may be denoted by the following equation (3):

$$\mathcal{T}(R, C) = \left\{ \langle t_{ij} \rangle \text{ where } \sum_{j\neq i} t_{ij} = R_i \text{ and } \sum_{j\neq i} t_{ji} = C_i \;\forall\, i \right\}. \tag{3}$$

It should be noted that the traffic distribution T could be any matrix in T(R,C) and could change over time. In a routing architecture consistent with certain embodiments of the present invention, it is desirable that the only assumption that needs to be made about T is that it is partially specified by row and column sum bounds. Accordingly, a routing strategy consistent with one embodiment of the present invention desirably (i) should permit routing every matrix in T(R,C), (ii) should not require reconfiguration of existing connections, i.e., should be oblivious to changes in the traffic matrix T as long as it belongs to T(R,C), and (iii) should be bandwidth efficient, i.e., should not use much more bandwidth than the conventional strategy of provisioning min($R_i$, $C_j$) amount of demand from node i to node j.

One known model of a method for specifying bandwidth requirements of a VPN is the hose model, as explained in N. G. Duffield, P. Goyal, A. G. Greenberg, P. P. Mishra, K. K. Ramakrishnan, J. E. van der Merwe, "A flexible model for resource management in virtual private network", *ACM SIGCOMM 1999*, August 1999, the teachings of which are incorporated herein by reference. In this model, the traffic matrix is specified only partially, such that, for each VPN endpoint i, only $R_i$ and $C_i$ are specified, $R_i$ being the maximum total bandwidth of traffic that i will send into the network at any time, and $C_i$ being the maximum total bandwidth of traffic that i will ever receive from the network at any time. The network capacity reserved for the VPN should be sufficient for every possible traffic pattern that is consistent with the $R_i$ and $C_i$ values.

It is desirable that a network be "rapidly self healing," i.e., quickly restoring network service for all the currently carried traffic at time scales faster than the convergence times of routing protocols, even when the network is carrying highly or unpredictably varying traffic. One approach to self-healing is by using MPLS restoration, wherein bypass paths for every label-switched path or for every router and link in the network are pre-computed. This pre-computation permits the rapid bypass of failed nodes or links to permit service restoration. However, such methods generally require adaptation of primary and possibly backup paths to changing traffic conditions. In contrast, for a routing scheme consistent with certain embodiments of the present invention, traffic is routed in a manner that does not require dynamic adaptation to traffic changes, yet only minimal network configuration changes may be necessary for the network to recover from router and link failures.

In a routing scheme consistent with certain embodiments of the present invention, a generalized scheme is implemented wherein possibly unequal split ratios are employed, and the problem of routing so as to maximize network throughput is considered. Such a scheme advantageously may be made resilient to router node and optical-layer link failures so as to have utility in the context of IP-over-OTN. In particular, an IP-over-OTN routing scheme consistent with one embodiment of the invention routes packets in the optical layer with packet grooming at one intermediate router only, thereby providing the desirable statistical multiplexing properties of packet switching with highly variable traffic.

A routing scheme consistent with certain embodiments of the present invention permits a network to meet arbitrary (and possibly rapidly changing) traffic demands without requiring sophisticated traffic engineering mechanisms or additional network signaling. In fact, the network does not even need to detect changes in the traffic distribution. The only knowledge about the traffic that might be required is the limits imposed by the total capacity of all line cards that connect to external interfaces at network edges.

Figure 4:
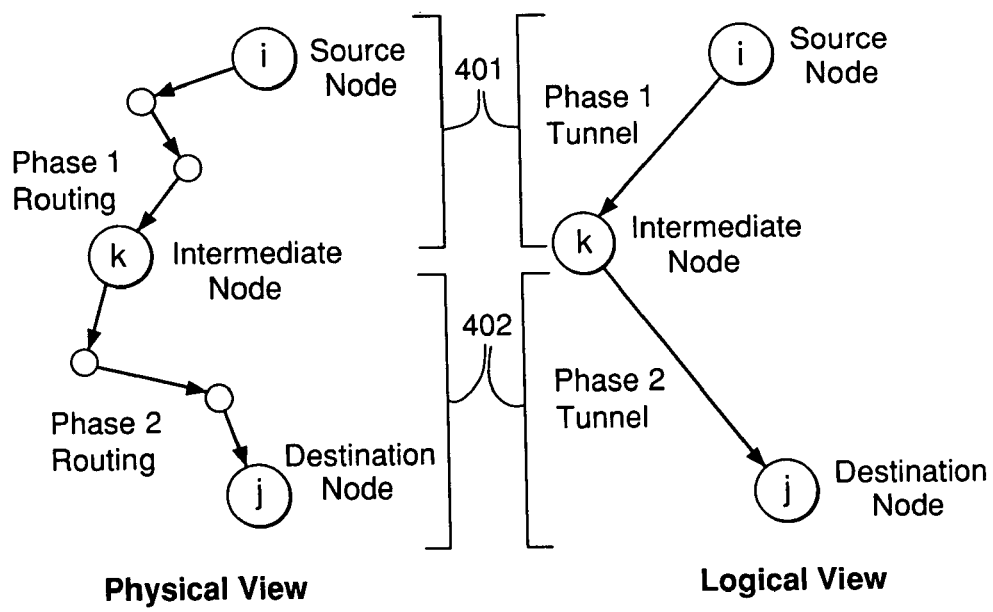
FIG. 4 shows physical and logical views of an exemplary two-phase routing scheme consistent with one embodiment of the present invention.

With reference now to FIG. 4, a two-phase routing scheme consistent with one embodiment of the present invention is illustrated in both physical and logical views. In phase 1 (401), a predetermined fraction $\alpha_k$ of the traffic entering the network at any node i is distributed to one or more intermediate nodes k, independent of the final destination of the traffic. In phase 2 (402), each node k receives traffic destined for different destinations and routes the received traffic to the respective destinations. One method of implementing this routing scheme is to form fixed-bandwidth tunnels between the nodes, some of which carry phase 1 traffic, and others of which carry phase 2 traffic. The two-phase routing strategy works because the bandwidth required for these tunnels depends only on R and C, and not on the individual entries in the traffic matrix. It is noted that, in phase 1, $\alpha_1, \alpha_2, \ldots, \alpha_n$ are such that the following equation (4) is satisfied:

$$\Sigma_{i=1}^{n} \alpha_i = 1 \quad (4)$$

The two-phase routing method will now be described in further detail. For a given node i with maximum outgoing traffic $R_i$, node i sends $\alpha_k R_i$ amount of this traffic to intermediate node k during phase 1, for each k∈N. Thus, the demand from node i to node k as a result of phase 1 is $\alpha_k R_i$. At the end of phase 1, node k has received $\alpha_k R_i$ from each node i. It is noted that, since the sum of the row bounds must equal the sum of the column bounds, the total traffic received at node k from all sources i is $$\sum_{i=1}^{n} \alpha_k R_i = \sum_{j=1}^{n} \alpha_k C_j.$$

Out of the traffic received at node k after phase 1, the traffic destined for node j is $\alpha_k t_{ij}$, assuming that traffic to the same destination is split in predetermined ratios. Thus, the total traffic that needs to be routed from node k to node j during phase 2, i.e., the traffic demand from node k to node j, is as set forth in the following equation (5):

$$\sum_{i \in N} \alpha_k t_{ij} = \alpha_k C_j. \quad (5)$$

Accordingly, since in phase 1, k is essentially the same as j, and in phase 2, k is essentially i, the total demand from node i to node j as a result of routing in phases 1 and 2 is ($\alpha_j R_i + \alpha_i C_j$), which can be derived without knowledge of the matrix T∈T(R,C). The following three properties characterize this two-phase routing scheme:
  (i) Routing is oblivious to traffic variations. The demands that need to be routed during phases 1 and 2 do not depend on the specific traffic matrix T∈T(R,C), but only on the row and column sum bounds that constrain T (i.e., the set T(R,C)).
  (ii) Routed demands are traffic matrix-independent. The total demand between nodes i and j as a result of routing in phases 1 and 2 is $t_{ij}' = \alpha_j R_i + \alpha_i C_j$ and does not depend on the specific matrix T∈T(R,C).
  (iii) Provisioned capacity is completely used. For each matrix T∈T(R,C), the routing scheme completely utilizes the associated point-to-point demands on phases 1 and 2.

Property (ii) implies that the scheme handles variability in traffic matrix T∈T(R,C) by effectively routing a transformed matrix T'=<$t_{ij}'$> that depends only on the row and column sum bounds and the distribution ratios $\alpha_1, \alpha_2, \ldots, \alpha_n$, and not on the specific matrix T∈T(R,C), thereby rendering the routing scheme oblivious to changes in the traffic distribution.

Ensuring that the traffic distribution obeys the row or column sum bounds can be accomplished by making the row or column sum bounds equal to the sum of the line card capacities that connect to external interfaces at a node, thereby enforcing the constraint in a hard manner at the physical layer. Alternatively, a differentiated services (DiffServ)-type policing scheme, whereby traffic entering a network is classified and possibly conditioned at the boundaries of the network and assigned to different behavior aggregates, can rate-limit the total traffic that enters the network at each ingress node and guarantee that each node is not over-subscribed.

Thus, in a routing method consistent with one embodiment of the present invention, routing decisions at each source node during phase 1 do not require any network-wide state information (e.g., how the traffic at other peering points is varying), and routing decisions during phase 2 are based on the packet destination only. Additionally, the network can meet any traffic distribution as long as the ingress/egress points are not oversubscribed, and congestion can be avoided by either hard rate guarantees of line cards connecting to other carriers, or by implementing a differentiated services-type policing scheme for rate-limiting the traffic entering the network at a node. Moreover, the routing scheme is oblivious and robust to any changes in the traffic distribution, and providing end-to-end bandwidth guarantees does not require any reconfiguration of the network in real-time.

Figure 5:
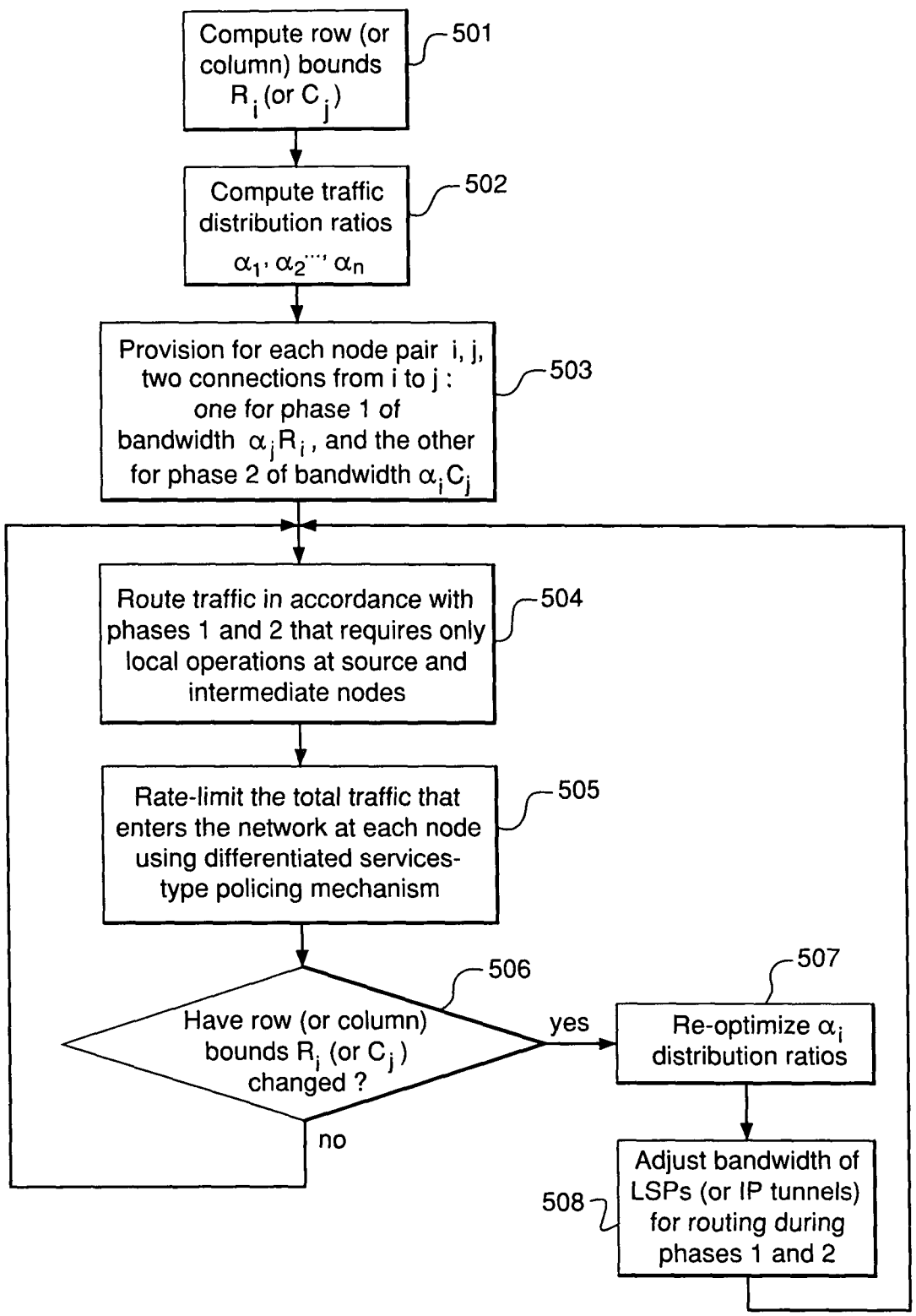
FIG. 5 is a flow chart showing an exemplary method for a routing architecture consistent with one embodiment of the present invention.

As illustrated in the flowchart of FIG. 5, a routing architecture consistent with one embodiment of the present invention may be implemented in the following exemplary method: At step 501, the method begins with computing row (or column) bounds $R_i$ (or $C_i$) using inter-autonomous system peering agreements and/or rates of line cards at each node connecting to other carriers. Next, at step 502, traffic distribution ratios $\alpha_1, \alpha_2, \ldots, \alpha_n$ are computed (using an exemplary algorithm that optimizes the required network bandwidth, as will be described in further detail below). Next, at step 503, for each node pair i,j, two sets of connections (e.g., MPLS LSPs, IP tunnels, or optical layer circuits) are provisioned: one set for phase 1 of bandwidth $\alpha_j R_i$ from node i to one or more intermediate nodes and the other set for phase 2 of bandwidth $\alpha_i C_j$ from the one or more intermediate nodes to node j. Next, at step 504, traffic is routed in accordance with phases 1 and 2 (as has been described in further detail above), which requires only local operations at source and intermediate nodes. Next, at step 505, a differentiated services-type policing mechanism is used to rate-limit the total traffic that enters the network at each node. Next, at step 506, a determination is made whether the row (or column) bounds $R_i$ (or $C_i$) have changed, e.g., as a result of new peering agreements or modifications to existing ones. If the bounds have not changed, then the method returns to step 504 to continue the routing operation. If the bounds have changed, then at step 507, the $\alpha_i$ distribution ratios are re-optimized, and at step 508, the bandwidth of the LSPs (or optical layer circuits, or IP tunnels) for routing during phases 1 and 2 may be adjusted accordingly before returning to step 504.

In the foregoing method, packets belonging to the same end-to-end connection may arrive out of order at the egress node if traffic is split within the same connection. This situation may be avoided by using per-flow splitting in phase 1 of the scheme. Additionally and/or alternatively, the traffic split ratios $\alpha_i$ can be generalized to depend on source and/or destination nodes of the traffic, as will be explained in further detail below.

An exemplary path-indexed linear programming formulation for routing with restoration following link failures in one embodiment of the present invention will now be described, wherein flows are augmented in the solution of the primal problem, and weights are updated in a multiplicative fashion in the solution of the dual problem. The primal and dual problems and solutions may be characterized as follows:

1. If the primal problem has n variables and m resource constraints, then the dual problem will have m variables and n resource constraints. Therefore, the constraint matrix of the dual problem is the transpose of the constraint matrix of the primal problem.
2. There is a one-to-one correspondence between the primal constraints and the dual variables, i.e., a variable in the dual problem is paired with an inequality in the primal problem, and similarly for the primal variables and the dual constraints.
3. The objective function of the dual problem is determined by the right-hand side of the primal constraints, and similarly for the objective function of the primal problem and the right-hand side of the dual constraints.

Figure 6:
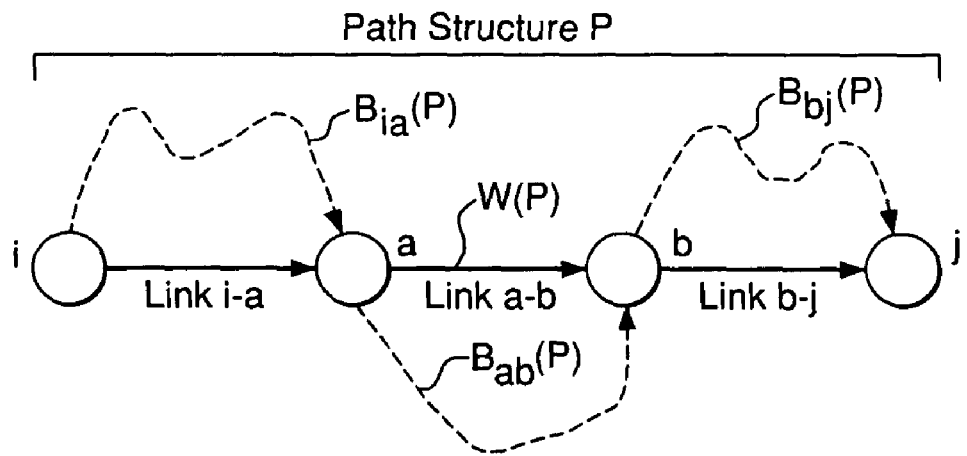
FIG. 6 shows a path structure that includes link backup detours protecting links on the primary path in a routing method consistent with one embodiment of the present invention.

As illustrated in FIG. 6, in the following exemplary linear programming formulation, a path structure P includes W(P), which represents a primary (working) path from node i to node j, and $B_e(P)$, which represents a link backup detour, for each link e on W(P). Thus, a primary path with h hops is associated with h link detours for local restoration against link failures.

Figure 7:
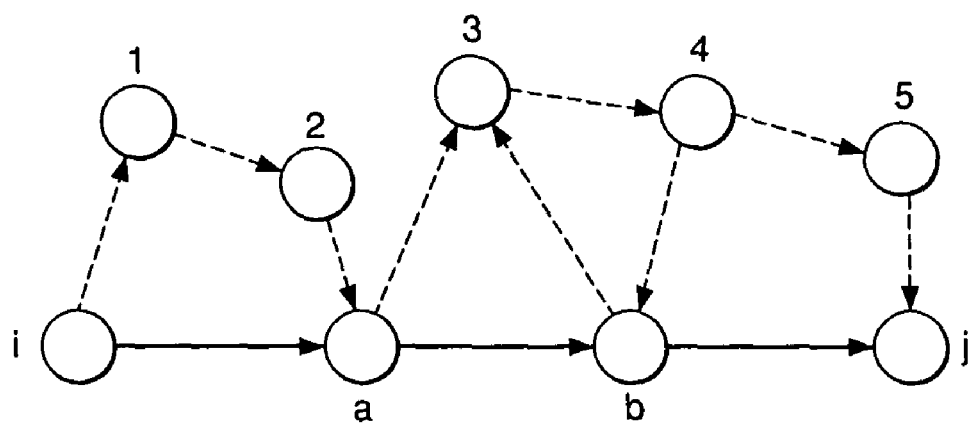
FIG. 7 shows a path structure that includes backup bandwidth sharing across link backup detours in a routing method consistent with one embodiment of the present invention.

Under the single-event failure model, backup paths for different links can share bandwidth not only within the same connection, but also across one or more different connections. For example, as illustrated in FIG. 7, backup detour a-3-4-b for link a-b and backup detour b-3-4-5-j for link b-j can share bandwidth on their common link 3-4.

The set of all path structures (with link detours) from node i to node j is denoted by $P_{ij}$. Thus, a path structure $P \in P_{ij}$ consists of primary path W(P) and one or more link backup detours protecting each link on the primary path. The primary traffic associated with path structure P is designated by x(P).

The problem of routing with restoration so as to maximize the network throughput can be formulated as the following exemplary path-indexed linear programming formulation, with the constraints of equation (7) and inequalities (8-9):

$$\text{maximize} \sum_{i \in N} \alpha_i,$$

subject to $$\sum_{P \in \mathcal{P}_{ij}} x(P) = \alpha_j R_i + \alpha_i C_j \quad \forall\, i,j \in N, i \neq j, \qquad (7)$$

$$\sum_{i,j} \sum_{P \in \mathcal{P}_{ij}, e \in W(P)} x(P) + \sum_{i,j} \sum_{P \in \mathcal{P}_{ij}, e \in B_f(P)} x(P) \leq u_e \quad \forall\, e, f \in E, e \neq f, \qquad (8)$$

$$x(P) \geq 0 \quad \forall\, P \in \mathcal{P}_{ij}, \forall\, i,j \in N, \qquad (9)$$

The $\alpha_i$ values in an optimal solution of the above linear program are represented by $\alpha_i^*$, and the optimum objective function value is represented by $\lambda^*$, wherein $\lambda^* = \Sigma_i \alpha_i^*$. If $\lambda^* \geq 1$, then the problem is feasible, i.e., the given demands can be routed on the network. The $\alpha_i^*$ values can be reduced by a factor of $\lambda^*$ to get the actual split ratios, and the explicit paths along which demands are routed can be determined from the solution of the above problem. If the value $\lambda^* < 1$, then the problem is infeasible. In this case, the egress (or ingress) constraints $R_i$ ($C_i$) may be scaled down by division by a factor of $1/\lambda^*$, and the problem will then be feasible for routing under the given link capacities. Alternatively, the link capacities may be scaled up by multiplication by a factor of $1/\lambda^*$ to accommodate routing of all the given demands.

Since a network generally can have an exponential number of paths (in the size of the network), the foregoing (primal) linear program can possibly have an exponential number of variables, and its dual (which will be provided in detail below) can have an exponential number of constraints. Thus, these programs might not be well suited for running on medium- to large-sized networks. Nevertheless, such a primal/dual formulation is useful in designing a fast, polynomial-time combinatorial algorithm for the problem, as will be explained below.

A fast combinatorial approximation algorithm may be used to compute the split ratio up to $(1+\epsilon)$-factor of the optimal objective function value for any $\epsilon > 0$. The value of e may be selected to provide the desired degree of optimality for the solution. This algorithm is preferably an FPTAS scheme and runs in time that is polynomial in the input size and I/E. Since the algorithm maintains primal and dual solutions at each step, the optimality gap can be estimated by computing the ratio of the primal and dual objective function values.

A dual formulation of the linear program set forth in equation (7) and inequalities (8-9) above associates a variable w(e,f) with each link-capacity constraint in inequality (8) and a variable $\pi_{ij}$ with each demand constraint in equation (7). For each link e=(i,j)∈E, g(e) denotes the cost of the shortest detour from node i to node j under link costs c(e')=w(e',e)∀e'∈E,e'≠e and c(e)=∞. SP(i,j) denotes the cost of the shortest path from node i to node j under the link costs c(e) set forth in the following equation (10):

$$c(e) = g(e) + \sum_{f \in E, f \neq e} w(e, f) \quad \forall\, e \in E. \tag{10}$$

Essentially, the definition of SP(i,j) corresponds to a minimum cost structure P∈$P_{ij}$ whose links e on working path W(P) have cost $$\sum_{f \neq e} w(e, f)$$

and backup detours $B_e(P)$ protecting each primary link e have cost g(e).

With the definition of the quantity SP(i,j) as set forth above and after simplification and removal of the dual variables $\pi_{ij}$, the dual linear programming formulation may be written as follows, with the constraints of inequalities (11-12):

$$\text{minimize} \sum_{e \in E} u_e \sum_{f \in E, f \neq e} w(e, f),$$

subject to $$\sum_{i: i \neq k} R_i SP(i, k) + \sum_{j: j \neq k} C_j SP(k, j) \geq 1 \quad \forall\, k \in N, \tag{11}$$

$$w(e, f) \geq 0 \quad \forall\, e, f \in E, e \neq f. \tag{12}$$

For a given node k∈N, V(k) denotes the left-hand side of the constraint in inequality (11). Given weights w(e,f), V(k) can be computed in polynomial time by simple shortest-path computations.

Given a set of weights w(e,f), a feasible solution for the dual program exists if and only if the following inequality (14) is satisfied:

$$\min_{k \in N} V(k) \geq 1. \tag{14}$$

The algorithm begins with equal initial weights w(e,f)=δ (the quantity δ depends on ε and is derived later). Then, the following steps (1-6) are repeated until the dual feasibility constraints are satisfied:

(1) The node k is computed for which V(k) is minimum, thereby identifying a node $\bar{k}$ as well as path structure (including link detours) $P_i$ from node i to node $\bar{k}$ for all i and path structure (including link detours) $Q_j$ from node $\bar{k}$ to node j for all j.

(2) For each e∈E, $N_P(e)$ is defined as the set of nodes i for which $P_i$ (i.e., either its primary working path $W(P_i)$ or any of its link detours $B_j(P_i)$) contains link e, and $N_Q(e)$ is defined as the set of nodes j for which $Q_j$ (i.e., either its primary working path $W(Q_j)$ or any of its link detours $B_j(Q_j)$) contains link e. In the event link e belongs to both a primary path and any of its associated link detours, the associated node in the one or more sets is counted with a multiplicity of 2. The fraction a is then computed using the following equation (15):

$$a = \min_{e \in E} \frac{u_e}{\sum_{i \in N_P(e)} R_i + \sum_{j \in N_Q(e)} C_j}. \tag{15}$$

(3) An amount of flow $\alpha R_i$ is sent on path structure $P_i$ for all i, and an amount of flow $\alpha C_j$ is sent on path structure $Q_j$ for all j. For each link e, (i) the total working flow Δ(e) that is sent on link e and (ii) the flow Δ'(e,f) that appears on link e after failure of any other link f≠e are computed.

(4) For each e∈E, w(e,f) is updated as w(e,f)←w(e,f)(1+εΔ(e)/$u_e$) for all f≠e, which corresponds to the working flow on link e.

(5) For each e,f∈E,f≠e, w(e,f) is updated as w(e,f)←w(e,f)(1+εΔ'(e,f)/$u_e$) for all f≠e, which corresponds to the restoration flow on link e due to the failure of link f.

(6) The split ratio $\alpha_{\bar{k}}$ associated with node $\bar{k}$ is incremented by α.

When the foregoing procedure terminates, dual feasibility constraints will be satisfied. However, primal capacity constraints on each link may be violated, since the original (and not residual) link capacity at each stage is employed in the procedure. To remedy this, the split ratios $\alpha_i$ may be scaled down uniformly so that capacity constraints are obeyed.

FIG. 8 shows pseudo-code for an exemplary algorithm that may be employed to implement the foregoing described exemplary method. In the pseudo-code, array flow(e) keeps track of the working traffic on link e, and array bkp(e,f) keeps track of the restoration traffic that appears on link e due to failure of link f. The variable G is initialized to 0 and remains less than 1 as long as the dual constraints remain unsatisfied. After the while loop terminates, the factor by which the capacity constraint on each link e gets violated is computed into array scale(e). Finally, the $\alpha_i$ values are divided by the maximum capacity violation factor, and the resulting values are output as the optimum.

Two theorems related to the exemplary algorithm are provided, as follows.

Theorem 1: Considering that the values of ε and δ are related to the approximation factor guarantee of the algorithm set forth in FIG. 8, then, for any given ε'>0, the algorithm computes a solution with an objective function value within (1+ε')-factor of the optimum for the following equations (16-17):

$$\delta = \frac{1+\varepsilon}{[2(1+\varepsilon)(n+m-2)(n-1)^2]^{1/\varepsilon}}, \tag{16}$$

$$\varepsilon = 1 - \frac{1}{\sqrt{1+\varepsilon'}}. \tag{17}$$

Theorem 2: For any given ε>0 chosen to provide the desired approximation factor guarantee in accordance with Theorem 1, the algorithm runs in time that is polynomial in the network size and 1/ε.

Thus, it has been shown that a routing strategy consistent with one embodiment of the present invention may permit a service provider to route all traffic distributions within a network's ingress-egress capacity constraints to provide local restoration against link failures. A scheme consistent with one embodiment of the present invention can (i) handle any traffic pattern permissible within the constraints imposed by the network's edge-link capacities, (ii) avoid network congestion under high traffic variability without requiring dynamic link weight or routing policy adjustments, and (iii) has capacity requirements that are close to those needed to accommodate one bad traffic pattern, even though it can handle all possible traffic patterns subject to ingress-egress capacity constraints. The ability to handle large traffic variations with a fixed routing scheme can greatly simplify network operations and achieve the foregoing goals without incurring high overhead in capacity costs.

A method of routing consistent with one embodiment of the present invention may provide one or more of the advantages of more efficient utilization of network service-level capacity, reducing congestion of routers at network nodes, and higher packet throughput of the network. The method may be implemented for a requested LSP by either a centralized network management system or by each node of the network, or both. An implementation employing a centralized network management system that distributes results to network nodes may be preferred for coordination of provisioning of new paths. A distributed implementation in each node of the network may be preferred when no centralized network management system exists and/or if the requested LSP is a distributed request implemented with control packets routed through a network.

The various functions of a method of routing consistent with one embodiment of the present invention may be implemented with circuit elements or may also be implemented in the digital domain as processing steps in a software program. Such software may be employed in, for example, a digital signal processor, micro-controller, or general-purpose computer.

It should be understood that the term "router," as used herein, may refer to a single hardware device or a plurality of interconnected hardware devices, such as a switch fabric, a combination of software and hardware elements, or a software program.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that the steps of the exemplary methods of routing set forth herein are not necessarily required to be performed in the order described, and the order of the steps of such methods should be understood to be merely exemplary. Likewise, additional steps may be included in such methods, and certain steps may be omitted or combined, in routing methods consistent with various embodiments of the present invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for supporting recovery from failure of a link in a network of nodes interconnected by links, the method comprising: (a) the computer generating, for each of a plurality of potential intermediate nodes between an ingress point and an egress point of the network, a sum of (i) a capacity constraint between the ingress point and the intermediate node and (ii) a capacity constraint between the intermediate node and the egress point; (b) the computer selecting, from among the potential intermediate nodes, an intermediate node that minimizes the sum generated in step (a), wherein the selection identifies a first path structure between the ingress point and the intermediate node, and a second path structure between the intermediate node and the egress point, each path structure comprising a primary path and one or more link backup detours protecting each link on the primary path; (c) the computer implementing, after completion of step (b) and during a first routing phase, a first routing method for routing a first fraction of a service level between the ingress point and the intermediate node along the primary path of the first path structure; (d) the computer implementing, after completion of step (b) and during a second routing phase, a second routing method for routing a second fraction of the service level between the intermediate node and the egress point along the primary path of the second path structure; and (e) the computer computing a split ratio by determining the minimum value, across all links e, of the link capacity for link e divided by the sum of the ingress capacity constraints of the paths of the first path structure that contain link e and the egress capacity constraints of the paths of the second path structure that contain link e; wherein: the first fraction of the service level is determined by the product of the split ratio and the capacity constraint between the ingress point and the intermediate node; and the second fraction of the service level is determined by the product of the split ratio and the capacity constraint between the intermediate node and the egress point.

2. The invention of claim 1, wherein:
   a traffic matrix corresponding to the ingress and egress points has row and column sum bounds;
   the capacity constraint between the ingress point and the intermediate node is the row sum bounds of the traffic matrix; and
   the capacity constraint between the intermediate node and the egress point is the column sum bounds of the traffic matrix.

3. The invention of claim 1, further comprising (f) for all links e, computing the capacity usage on link e and for all links e, incrementing the flow sent on link e by an amount equal to the computed capacity usage on link e.

4. The invention of claim 3, further comprising:
   (h) for all links e, updating the link weights for each of the path structures based on the incremented flow sent on link e.

5. The invention of claim 4, further comprising:
   (i) incrementing the split ratio corresponding to the intermediate node by the split ratio computed in step (e).

6. The invention of claim 5, wherein the determination of the split ratio in step (e) is made by solving a linear program having primal and dual solutions, wherein flows along the links are augmented in the primal solution, and weights of the links are updated in a multiplicative fashion in the dual solution.

7. The invention of claim 6, further comprising:
   (j) repeating steps (a) through (i) until the feasibility constraints of the dual solution are satisfied.

8. The invention of claim 7, further comprising:
(k) scaling down the split ratio corresponding to the intermediate node by a maximum capacity violation factor, the maximum capacity violation factor being the factor by which the capacity constraint on each link e is violated.

9. The invention of claim 8, further comprising:
(l) using the scaled-down split ratio as the optimal traffic split ratio for a subsequent instance of step (e).

10. The invention of claim 6, wherein:
the primal solution is represented by the following linear programming formulation:

$$\text{maximize} \sum_{i \in N} \alpha_i,$$

subject to $$\sum_{P \in \mathcal{P}_{ij}} x(P) = \alpha_j R_i + \alpha_i C_j \forall\, i, j \in N, i \neq j,$$

$$\sum_{i,j} \sum_{P \in \mathcal{P}_{ij}, e \in W(P)} x(P) + \sum_{i,j} \sum_{P \in \mathcal{P}_{ij}, e \in B_f(P)} x(P) \leq u_e \forall\, e,$$

$$f \in E, e \neq f,$$

$$x(P) \geq 0 \forall\, P \in \mathcal{P}_{ij}, \forall\, i, j \in N; \text{ and}$$

the dual solution is represented by the following linear programming formulation:

$$\text{minimize} \sum_{e \in E} u_e \sum_{f \in E, f \neq e} w(e, f),$$

subject to $$\sum_{i: i \neq k} R_i SP(i, k) + \sum_{j: j \neq k} C_j SP(k, j) \geq 1 \forall\, k \in N,$$

$$w(e, f) \geq 0 \forall\, e, f \in E, e \neq f;$$

wherein:
 N represents the set of all nodes, which includes source node i, destination node j, and intermediate node k;
 E represents the set of all links e;
 P represents a given path structure from node i to node j;
 x(P) represents the traffic on path structure P;
 $\alpha_i$ represents the split ratio for traffic sent to node i;
 $\alpha_j$ represents the split ratio for traffic sent to node j;
 $R_i$ represents the maximum total bandwidth of traffic that node i sends into the network at any time;
 $C_j$ represents the maximum total bandwidth of traffic that node j receives from the network at any time;
 $u_e$ represents the available capacity for link e;
 w(e,f) represents the set of weights for link e, given failed link f;
 c(e) represents the link costs for link e;
 W(P) represents the working path containing primary links e;
 $B_e(P)$ represents the set of backup detours protecting each primary link e;
 SP(i,k) represents a minimum cost path structure P between node i and node k whose links e on working path W(P) have cost $$\sum_{f \neq e} w(e, f)$$

and backup detours $B_e(P)$ protecting each primary link e have cost g(e);

SP(k,j) represents a minimum cost path structure P between node k and node j whose links e on working path W(P) have cost $$\sum_{f \neq e} w(e, f)$$

and backup detours $B_e(P)$ protecting each primary link e have cost g(e); and
g(e) represents the cost of the shortest detour protecting link e under link costs c(e')=w(e',e)∀e'□E, e'≠e and c(e)=∞.

11. Apparatus for supporting recovery from failure of a path in a network of nodes interconnected by links, the apparatus adapted to: (a) generate, for each of a plurality of potential intermediate nodes between an ingress point and an egress point of the network, a sum of (i) a capacity constraint between the ingress point and the intermediate node and (ii) a capacity constraint between the intermediate node and the egress point; (b) select, from among the potential intermediate nodes, an intermediate node that minimizes the sum generated in step (a), wherein the selection identifies a first path structure between the ingress point and the intermediate node, and a second path structure between the intermediate node and the egress point, each path structure comprising a primary path and one or more link backup detours protecting each link on the primary path; (c) implement, after completion of step (b) and during a first routing phase, a first routing method for routing a first fraction of a service level between the ingress point and the intermediate node along the primary path of the first path structure; (d) implement, after completion of step (b) and during a second routing phase, a second routing method for routing a second fraction of the service level between the intermediate node and the egress point along the primary path of the second path structure; and (e) compute a split ratio by determining the minimum value, across all links e, of the link capacity for link e divided by the sum of the ingress capacity constraints of the paths of the first path structure that contain link e and the egress capacity constraints of the paths of the second path structure that contain link e; wherein: the first fraction of the service level is determined by the product of the split ratio and the capacity constraint between the ingress point and the intermediate node; and the second fraction of the service level is determined by the product of the split ratio and the capacity constraint between the intermediate node and the egress point.

12. The invention of claim 11, wherein:
a traffic matrix corresponding to the ingress and egress points has row and column sum bounds;
the capacity constraint between the ingress point and the intermediate node is the row sum bounds of the traffic matrix; and
the capacity constraint between the intermediate node and the egress point is the column sum bounds of the traffic matrix.

13. The invention of claim 11, wherein the apparatus is further adapted: (f) for all links e, to compute the capacity usage on link e; and (g) for all links e, to increment the flow sent on link e by an amount equal to the computed capacity usage on link e.

14. The invention of claim 13, wherein the apparatus is further adapted: (f) for all links e, to update the link weights for each of the path structures based on the incremented flow sent on link e.

15. The invention of claim 14, wherein the apparatus is further adapted: (i) to increment the split ratio corresponding to the intermediate node by the split ratio computed in step (e).

16. The invention of claim 15, wherein the determination of the split ratio in step (e) is made by solving a linear program having primal and dual solutions, wherein flows along the links are augmented in the primal solution, and weights of the links are updated in a multiplicative fashion in the dual solution.

17. The invention of claim 16, wherein the apparatus is further adapted: (j) to repeat steps (a) through (i) until the feasibility constraints of the dual solution are satisfied.

18. The invention of claim 17, wherein the apparatus is further adapted: (k) to scale scaling down the split ratio corresponding to the intermediate node by a maximum capacity violation factor, the maximum capacity violation factor being the factor by which the capacity constraint on each link e is violated.

19. The invention of claim 18, wherein the apparatus is further adapted: (l) to use the scaled-down split ratio as the optimal traffic split ratio for a subsequent instance of step (e).

20. The invention of claim 16, wherein:
the primal solution is represented by the following linear programming formulation:

$$\text{maximize} \sum_{i \in N} \alpha_i,$$

subject to $$\sum_{P \in \mathcal{P}_{ij}} x(P) = \alpha_j R_i + \alpha_i C_j \forall\, i,\, j \in N,\, i \neq j,$$

$$\sum_{i,j} \sum_{P \in \mathcal{P}_{ij}, e \in W(P)} x(P) + \sum_{i,j} \sum_{P \in \mathcal{P}_{ij}, e \in B_f(P)} x(P) \leq u_e \forall\, e,$$

$$f \in E,\, e \neq f,$$

$$x(P) \geq 0 \forall\, P \in \mathcal{P}_{ij},\, \forall\, i,\, j \in N;\text{ and}$$

the dual solution is represented by the following linear programming formulation:

$$\text{minimize} \sum_{e \in E} u_e \sum_{f \in E, f \neq e} w(e, f),$$

subject to $$\sum_{i: i \neq k} R_i SP(i, k) + \sum_{j: j \neq k} C_j SP(k, j) \geq 1 \forall\, k \in N,$$

$$w(e, f) \geq 0 \forall\, e,\, f \in E,\, e \neq f;$$

wherein:
N represents the set of all nodes, which includes source node i, destination node j, and intermediate node k;
E represents the set of all links e;
P represents a given path structure from node i to node j;
x(P) represents the traffic on path structure P;
$\alpha_i$ represents the split ratio for traffic sent to node i;
$\alpha_j$ represents the split ratio for traffic sent to node j;
$R_i$ represents the maximum total bandwidth of traffic that node i sends into the network at any time;
$C_j$ represents the maximum total bandwidth of traffic that node j receives from the network at any time;
$u_e$ represents the available capacity for link e;
w(e,f) represents the set of weights for link e, given failed link f;
c(e) represents the link costs for link e;
W(P) represents the working path containing primary links e;
$B_e(P)$ represents the set of backup detours protecting each primary link e;
SP(i,k) represents a minimum cost path structure P between node i and node k whose links e on working path W(P) have cost $$\sum_{f \neq e} w(e, f)$$

and backup detours $B_e(P)$ protecting each primary link e have cost g(e);
SP(k,j) represents a minimum cost path structure P between node k and node j whose links e on working path W(P) have cost $$\sum_{f \neq e} w(e, f)$$

and backup detours $B_e(P)$ protecting each primary link e have cost g(e); and
g(e) represents the cost of the shortest detour protecting link e under link costs c(e')=w(e',e)∀e'□E, e'≠e and c(e)=∞.

21. A network of nodes interconnected by links, wherein the network comprises an apparatus for supporting recovery from failure of a path of the network, the apparatus adapted to: (a) generate, for each of a plurality of potential intermediate nodes between an ingress point and an egress point of the network, a sum of (i) a capacity constraint between the ingress point and the intermediate node and (ii) a capacity constraint between the intermediate node and the egress point; (b) select, from among the potential intermediate nodes, an intermediate node that minimizes the sum generated in step (a), wherein the selection identifies a first path structure between the ingress point and the intermediate node, and a second path structure between the intermediate node and the egress point, each path structure comprising a primary path and one or more link backup detours protecting each link on the primary path; (c) implement, after completion of step (b) and during a first routing phase, a first routing method for routing a first fraction of a service level between the ingress point and the intermediate node along the primary path of the first path structure; (d) implement, after completion of step (b) and during a second routing method for routing a second fraction of the service level between the intermediate node and the egress point along the primary path of the second path structure; and (e) compute a split ratio by determining the minimum value, across all links e, of the link capacity for link e divided by the sum of the ingress capacity constraints of the paths of the first path structure that contain link e and the egress capacity constraints of the paths of the second path structure that contain link e; wherein: the first fraction of the service level is determined by the product of the split ratio and the capacity constraint between the ingress point and the intermediate node; and the second fraction of the service level is determined by the product of the split ratio and the capacity constraint between the intermediate node and the egress point.

22. The network of claim 21, wherein the apparatus is a centralized controller adapted to communicate with the nodes to control routing through the network.

23. The network of claim 21, wherein each node comprises an instance of the apparatus such that control of routing is distributed within the network.

* * * * *